(12) United States Patent
Chen

(10) Patent No.: US 7,239,503 B2
(45) Date of Patent: Jul. 3, 2007

(54) FOAM SUPPORT FOR MOBILE ELECTRONIC DEVICE DISPLAY

(75) Inventor: Chao Chen, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

(21) Appl. No.: 10/891,515

(22) Filed: Jul. 15, 2004

(65) Prior Publication Data

US 2005/0013101 A1    Jan. 20, 2005

(30) Foreign Application Priority Data

Jul. 15, 2003    (GB) ................................ 0316547.9

(51) Int. Cl.
   *G06F 1/16*    (2006.01)
(52) U.S. Cl. ..................... 361/681; 361/683; 349/60
(58) Field of Classification Search ........ 361/679–683, 361/807–812; 248/560–636; 312/7.2, 223.1
   See application file for complete search history.

(56) References Cited

U.S. PATENT DOCUMENTS

| | | | | |
|---|---|---|---|---|
| 5,009,326 A | * | 4/1991 | Reaves et al. ......... | 229/103.11 |
| 5,087,311 A | * | 2/1992 | Elliott et al. ................. | 156/212 |
| 5,400,160 A | | 3/1995 | Takahashi et al. | |
| 5,588,533 A | * | 12/1996 | Farison et al. .............. | 206/522 |
| 5,769,231 A | * | 6/1998 | Batsford ..................... | 206/522 |
| 5,858,509 A | * | 1/1999 | Polch et al. ................. | 428/166 |
| 6,173,203 B1 | * | 1/2001 | Barkley et al. ................. | 607/5 |
| 6,233,140 B1 | | 5/2001 | Cummings et al. | |
| 6,483,719 B1 | * | 11/2002 | Bachman .................... | 361/816 |
| 6,551,425 B2 | * | 4/2003 | Sylvester ..................... | 156/79 |
| 6,744,641 B2 | * | 6/2004 | Schnabel .................... | 361/818 |
| 2003/0172633 A1 | * | 9/2003 | Duffy .......................... | 55/495 |
| 2004/0013821 A1 | * | 1/2004 | Kadoya et al. .............. | 428/1.1 |

FOREIGN PATENT DOCUMENTS

| | | |
|---|---|---|
| GB | 2 327 288 | 1/1999 |
| GB | 2 336 019 | 10/1999 |
| JP | 2002-278467 | 9/2002 |

* cited by examiner

*Primary Examiner*—Lisa Lea-Edmonds
*Assistant Examiner*—Anthony Q. Edwards
(74) *Attorney, Agent, or Firm*—Borden Ladner Gervais LLP

(57) ABSTRACT

A foam support for use between a mobile electronic device display and a mobile electronic device frame having side edges for housing the display is provided. The foam support comprises a base and side tabs located around a perimeter of the base and configured to be folded into a position substantially perpendicular to the base and affixed to the side edges of the frame.

2 Claims, 6 Drawing Sheets

FOAM SUPPORT FOR MOBILE ELECTRONIC DEVICE DISPLAY

FIELD OF THE INVENTION

The present invention relates generally to mobile electronic devices. More particularly, the present invention relates to a foam support for a mobile electronic device display.

BACKGROUND OF THE INVENTION

In recent years, mobile electronic devices have become a popular communication tool. Providing businesspeople the capability to transmit and receive messages when they are not in the office, for example, has been very advantageous in allowing them to communicate with others on a more immediate basis. Moreover, many businesspeople also use such devices as organizers, notebooks and even address books.

In order for the user to review the information stored in their mobile electronic device, the user looks at a display, generally a liquid crystal display (LCD), located within the mobile electronic device. The display provides an area for the user to review what is stored in the memory of the device, such as a monitor provides for a computer.

Presently, most mobile electronic devices include a foam support which is placed between the back of the mobile electronic device display and the mobile electronic device frame. This foam support provides cushioning between the display and the frame. Some of these devices also include individual foam tabs which are placed on the sides of the frame. However, it tends to be difficult to affix individual foam tabs to the frame since they are very small and cumbersome for a person to handle. It is also quite time consuming to individually affix a multiple number of foam tabs to the frame of a mobile electronic device. Furthermore, due to the size of the foam tabs, it is quite difficult to align the tabs with the side of the frame, and such an operation may require several attempts.

SUMMARY OF THE INVENTION

According to an aspect of the invention, there is provided a foam support for placement between a mobile electronic device display and a mobile electronic device frame for housing the display. The frame has side edges substantially perpendicular to a frame base for retaining edges of the display. The foam support comprises a substantially planar base formed of a foam material; foam side tabs extending from, and in the same plane as, the planar base, the side tabs being located to engage the side edges of the planar base when the foam support is press-fit into the frame to cause the side tabs to be folded towards the planar base; and an adhesive layer provided on a first surface of the planar base and the side tabs for adhering to the frame to affix the foam support to the frame.

In accordance with another aspect of the invention, there is provided method of assembling a mobile electronic device display and mobile electronic device frame having side edges substantially perpendicular to a frame base for retaining edges of the display. The method comprises steps of placing a foam support on a fixture assembly to expose a first surface of the foam support, the foam support, formed of a foam material, having a substantially planar base, side tabs extending from, and in the same plane as, the planar base, and an adhesive layer provided on the first surface of the planar base and the side tabs; and the fixture assembly being configured to receive the frame; pressing the frame onto the fixture assembly to form the foam support to the frame, the side tabs being thereby folded against the side edges, such that the adhesive layer on the planar base and side tabs adheres to the frame base and the side edges, respectively; removing the frame and affixed foam support from the fixture assembly; and placing the display into the frame such that it is retained by the side edges and cushioned by the affixed foam support Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

According to an aspect of the invention, a foam support for a mobile electronic device is provided. The foam support is assembled between a mobile electronic device frame and a mobile electronic device display to provide support to the display in case the device is dropped. Side tabs of the foam support provide support on the sides of the device while a base provides support to the rear of the display. The side tabs also provide electrical insulation for the device when the back of the display and the frame are both made of metal.

Figure 1:
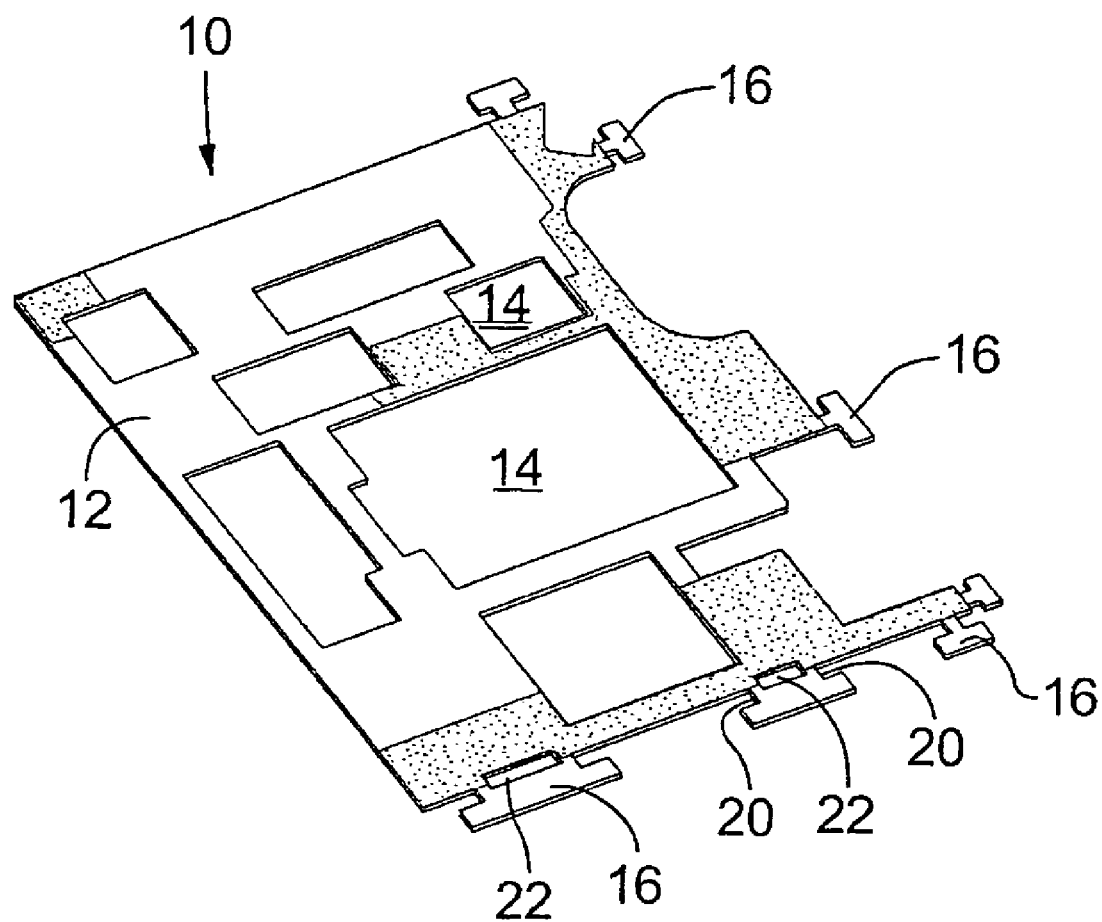
FIG. 1 is a perspective view of a foam support.

Turning to FIG. 1, a perspective view of an embodiment of a foam support for use between a mobile electronic device frame and mobile electronic device display is shown. The foam support 10 comprises a base 12 with apertures, two of which are labelled 14. When the foam support 10 is assembled with the mobile electronic device frame and the mobile electronic device display, the apertures 14 receive abutments located on the device frame or the mobile electronic device display. During the assembly process, the apertures 14 are used to assist in the alignment of the foam support 10 with the frame so that the foam support and the frame are aligned when the two are affixed together. This is described in more detail below with respect to FIG. 7.

The foam support 10 further comprises a set of side tabs 16 located about a perimeter of the base 12. The side tabs 16 are connected to the base 12 via flanges 20. The foam support 10 is tooled as a one-piece support such that the base 12, side tabs 16 and flanges 20 are preferably die cut out of a single piece of foam. In this embodiment, the base 12 is substantially square shaped with side tabs 16 located on three sides of the base 12.

In order to affix the foam support 10 to the frame, an adhesive is preferably placed over the entire surface of the side of the base 12 to be affixed to the frame so that there is continuous adhesive contact between the foam support 10 and the frame. On the other side of the base 12 (the side adhering to the display), an adhesive is preferably placed in selected areas so that the display may be easily removed from the foam support and frame combination when the display needs to be replaced or fixed. There is preferably no adhesive on the area of the side tabs which contact the mobile electronic device display so that the display has room to shift when assembled.

When the foam support 10 is affixed to the mobile electronic device frame while resting on an assembly fixture, the side tabs 16 fold along their flanges 20 into a position substantially perpendicular to the base 12. The folding is preferably along the perimeter of the base 12 (at one end of the flange 20), but may occur anywhere along the flange 20. The slots 22 assist in the folding of the flanges 20, since the position of the folding may be defined by the slots 22. As those skilled in the art will appreciate, the slots 22 are also sized according to known tooling specifications, for example, to reduce the chance of breakage of tooling blades used to cut out the foam support 10. For the side tabs which do not include slots, if a large radius is placed on one side of the flange 20, the folding more naturally occurs at the end without the large radius.

As can be seen in FIG. 1, the side tabs 16 are preferably symmetrical about the flange 20 or the centre of the slot 22 in order to protect against the sides tabs from skewing or sliding after being folded and affixed to the frame. This is further assisted by the balancing of friction forces and the adhesive on the foam support 10.

Figure 2:
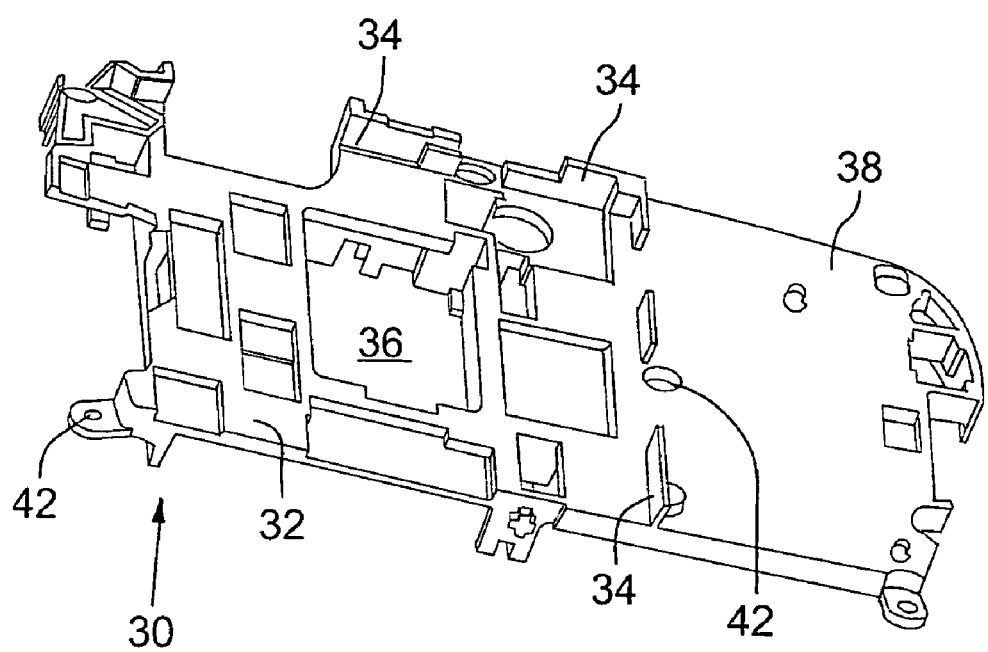
FIG. 2 is a perspective view of a mobile electronic device frame.

Turning to FIG. 2, a mobile electronic device frame is shown. The frame 30 comprises a base 32 having side edges 34 for housing the mobile electronic device display in place when assembled. An aperture 36 is located in the base 32 of the frame 30. As with the apertures 14 in the foam support 10, the aperture 36 is used to receive an abutment from the display and also aligns the frame 30 with the foam support 10 prior to the two parts being affixed together. After the foam support is affixed to the frame, the adhesive located on the base 12 of the foam support 10 adheres to the base 32 of the frame 30 and the adhesive on the side tabs 16 adheres to the side edges 34 to affix the foam support 10 to the mobile electronic device frame 30. The frame 30 further includes an area 38 for housing other mobile electronic device components, such as a keyboard or keypad. Around a perimeter of the base 32, is a set of holes 42 for attaching the frame 30 to a mobile electronic device housing. The set of holes 42 may also be used to align the frame 30 with the foam support and fixture assembly described below during the assembly process prior to the foam support and the frame being affixed together.

Figure 3:
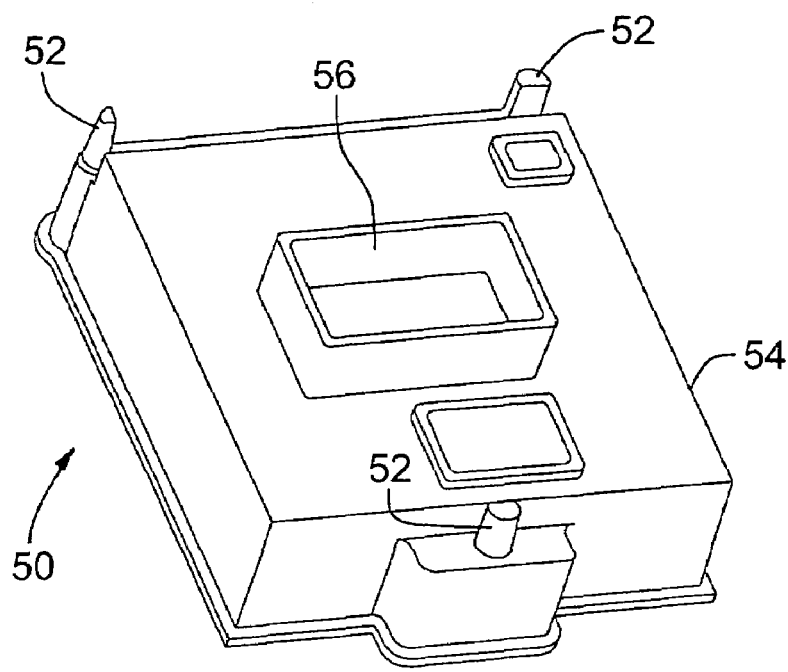
FIG. 3 is a perspective view of an assembly fixture for use in affixing the foam support to the mobile electronic device frame.

Turning to FIG. 3, an assembly fixture 50 for assisting in affixing the foam support 10 to the mobile electronic device frame 30 is shown. The fixture 50 comprises a set of positioning pins 52 located around its perimeter 54 which assist in keeping both the foam support and frame centred within the assembly fixture 50 during the affixation process. The assembly fixture 50 also comprises a set of abutments 56, representing abutments in the display, the frame or the housing, as positioning means so that when the foam support and frame are affixed, they are aligned with each other.

Figure 4:
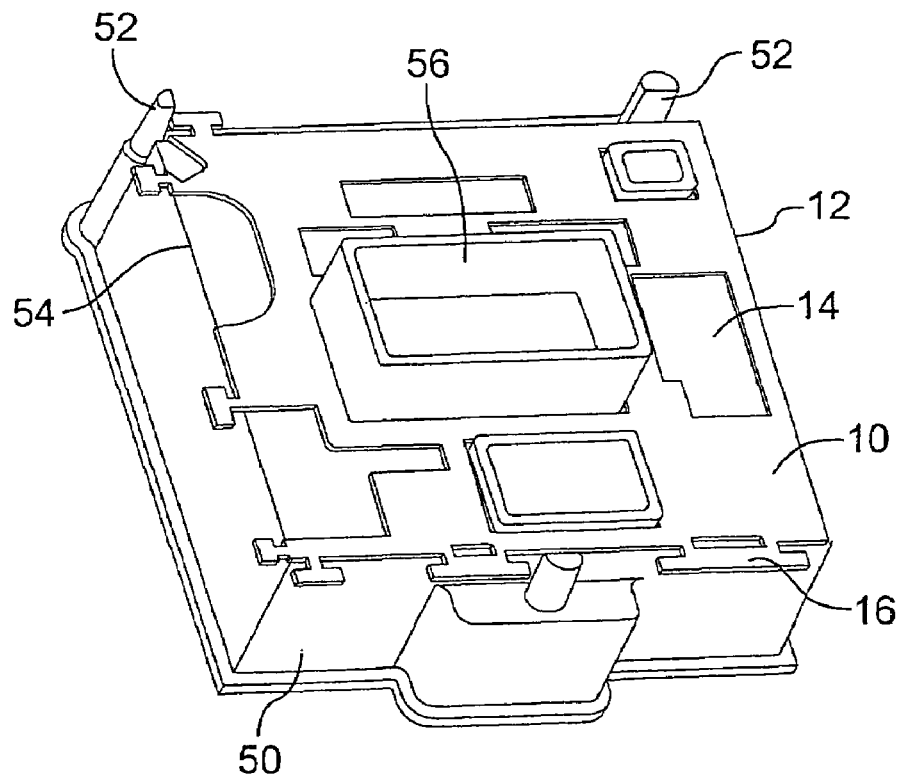
FIG. 4 is a perspective view of the foam support and the assembly fixture.

The assembly fixture 50 also assists in folding the side tabs 16 along the flanges 20 causing the side tabs to go from a position in the same plane as the base 12 of the foam support 10 to a position substantially perpendicular to the base 12 of the foam support. As shown in FIG. 4, the perimeter of the foam support 10 is substantially the same as the perimeter 54 of the assembly fixture 50 so that the side tabs 16 rest outside the perimeter 54 of the assembly fixture 50. When the frame is to be affixed to the foam support, the frame 30 is aligned so that the abutments 56 are received in the aperture 36 and then snapped down over the perimeter 54 of the assembly fixture 50 to fold the side tabs 16. As described above, one or more of the holes 42 may also assist in alignment of the frame 30, by receiving the positioning pins 52 on the assembly fixture 50. The positioning pins 52 may instead be configured to abut particular side or end portions of a frame or its apertures. Combinations of different types of positioning pins in a single assembly fixture are also contemplated.

Figure 5:
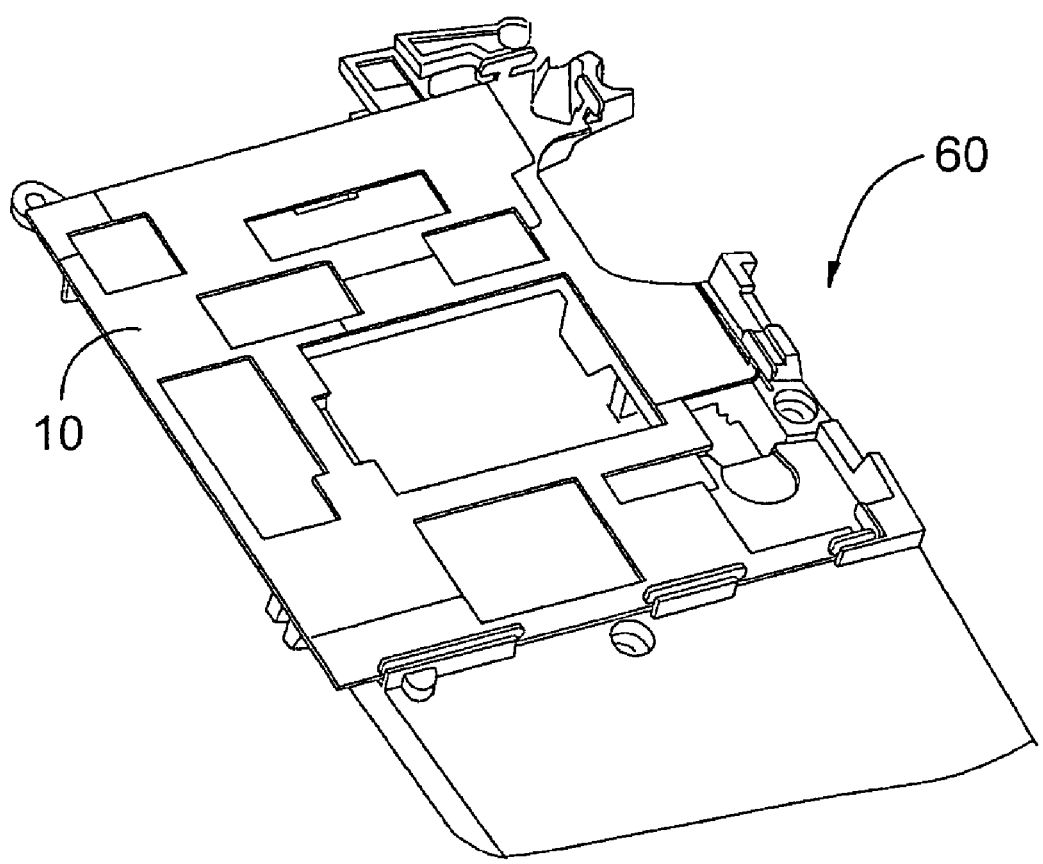
FIG. 5 is a perspective view of the foam support and frame combination.

As can be seen in FIG. 5, after the foam support 10 has been affixed to the frame 30 and the foam support and frame combination 60 have been removed from the assembly fixture, the side tabs 16 of the foam support 10 rest against the side edges 34 of the frame 30.

Figure 6:
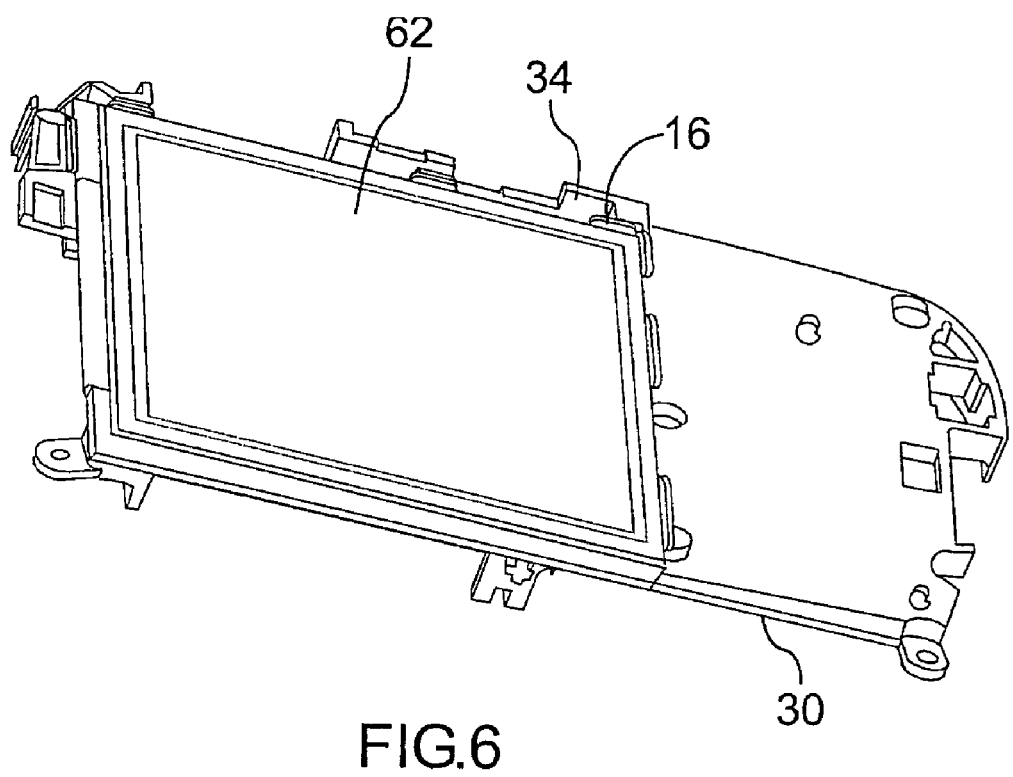
FIG. 6 is a perspective view of the foam support and frame combination assembled with a mobile electronic device display.

FIG. 6 is a diagram of a mobile electronic device display 62 assembled to the foam support and frame combination. The side tabs 16 are located between the side of the display and the side edges 34 of the frame 30 to provide support to the display in case the mobile electronic device is dropped. The side tabs 16 also provide electrical insulation in the case that the back of the display and the frame are made of metal.

Figure 7:
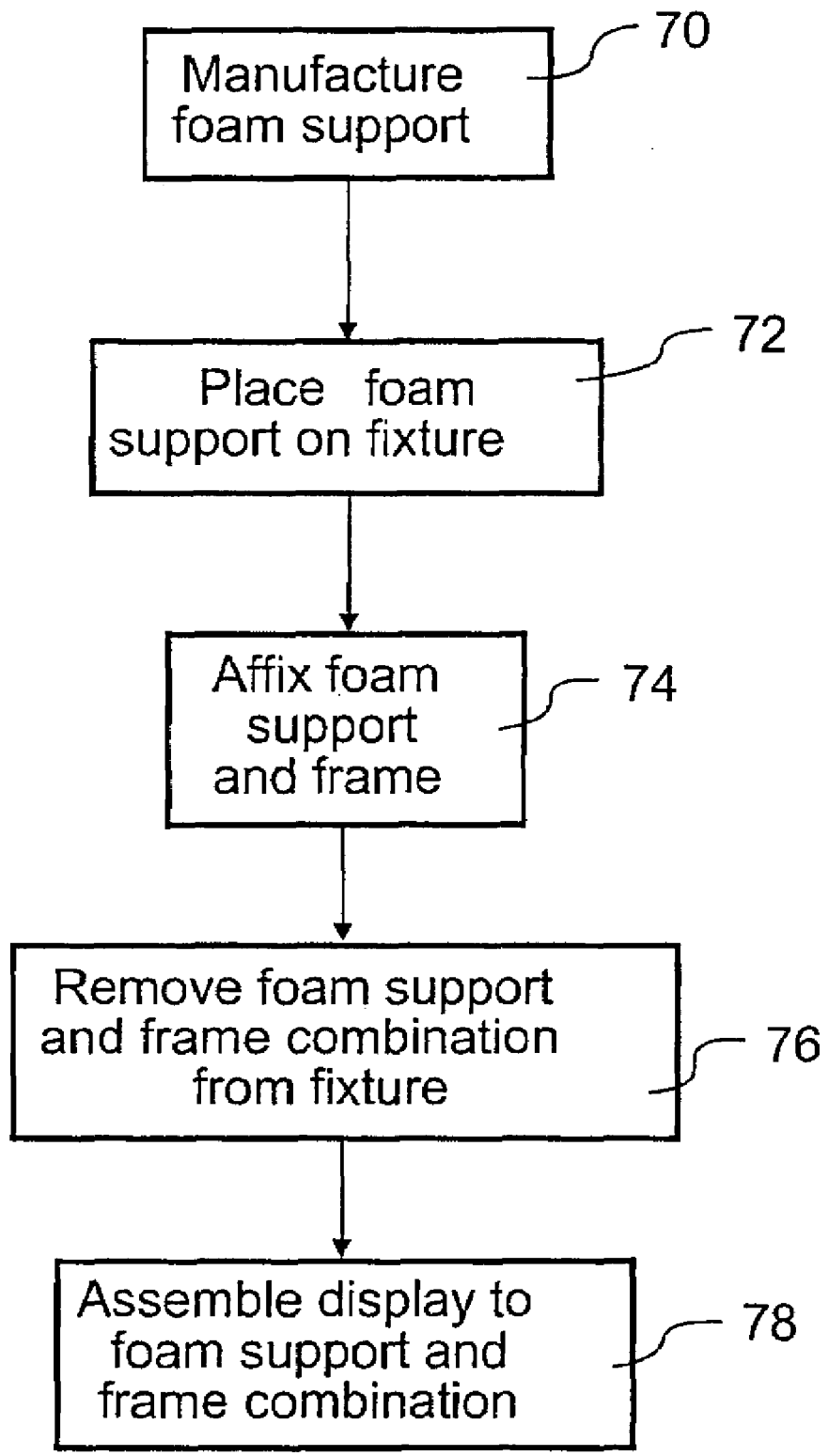
FIG. 7 is a flow diagram of a method of providing a foam support for a mobile electronic device display.

Turning to FIG. 7, a method of assembling a foam support between a mobile electronic device frame and a mobile electronic device display is shown. Firstly a foam support is manufactured using tooling machinery (step 70). The one-piece construction reduces the amount of time required to affix the foam support 10 to the mobile electronic device frame 30, relative to known support structures in which individual tabs are affixed a frame. The foam support is preferably designed and die cut, although other methods of manufacture will be known to one skilled in the art. As mentioned above, the die-cutting of the side tabs 16 and slots 22 preferably follows tooling specifications in order to protect the tooling machinery blades from breaking during the manufacturing process. After the foam support 10 has been die cut, an adhesive is placed on the entire side of the foam support which is to contact the frame. On the other side of the foam support 10, an adhesive is placed at selected areas of the base 12. There is preferably no adhesive placed on the side of the side tabs 16 contacting the display to allow for the display to shift into a final position when assembled. Alternatively, the adhesives may be placed on the foam prior to the foam support being designed and die cut.

In order to prevent the foam support 10 from adhering to surfaces other than the mobile electronic device frame and the mobile electronic device display, adhesive liners are preferably placed on both sides of the base 12 after the adhesives are applied to protect the adhesives from contacting other surfaces.

After the foam support is manufactured, the foam support is then placed on the surface of an assembly fixture with the side of the base which is to be adhered to the back of the display contacting the surface of the fixture (step 72). The adhesive liner remains on this side of the base so that the foam support does not adhere to the fixture. The foam support and fixture assembly is shown in FIG. 4. As can be seen in FIG. 4, some apertures 14 in the foam support 10 receive abutments on the assembly fixture. The abutments on the fixture provide means to position the foam support 10 on the assembly fixture 50 so that when the foam support and the frame are affixed, the foam support and frame are aligned. After the foam support has been placed on the fixture, the adhesive liner for the side of the base contacting the frame is removed and the frame is then placed on top of the foam support such that the foam support rests in between the frame 30 and the fixture 50 to affix the foam support to the frame (step 74). The positioning of the frame is assisted by the holes 42 in the frame which receive the positioning pins 52 as well as the apertures within the frame which receive the abutments in the fixture so that the frame rests directly on top of the foam support.

The foam support and the frame are affixed by the permanent adhesive on the base 12, side tabs 16 and flanges 20. Since the side tabs 16 rest outside the perimeter of the base and overly the perimeter of the assembly fixture 50, when the foam support and frame are affixed, the side tabs fold along the flanges to a position substantially perpendicular to the base of the foam support and affix to the side edges of the frame. After the foam support has been affixed to the frame, the foam support and frame are removed from the assembly fixture resulting in the foam support and frame combination 60 shown in FIG. 5 (step 76).

Alternatively, after the foam support has been manufactured, the adhesive liner protecting the side of the base to be adhered to the frame may be removed and the foam support initially affixed to the frame. The foam support is carefully placed in the base 32 of the frame 30 and the adhesive affixes the foam support 10 to the frame 30. After the foam support and mobile electronic device frame are affixed, the assembly fixture 50 is then placed on the other side of the foam support in order to fold the side tabs to a position perpendicular to the base 12. In order to avoid having the foam support affixed to the assembly fixture, the adhesive liner on the side of the base for adhering to the display is not removed.

After removing the remaining adhesive liner, the mobile electronic device display is then assembled to the frame and foam support combination 60 (step 78). The bottom of the display is preferably aligned with the bottom of the base 32 of the frame 30 and then placed within the base of the frame so that the back of the display contacts the adhesive areas of the foam support and the abutments go through the apertures.

After the mobile electronic display is assembled to the foam support and frame combination, the side tabs 16 fill in any gaps between the display and the frame. The side tabs protect the display in case a user drops their mobile electronic device, since the foam support provides cushioning to the display upon the device's impact on the ground. The side tabs of the foam support absorb the drop energy when the mobile electronic device is dropped, thereby protecting the display from cracking. Furthermore, when the mobile electronic device frame and the back of the mobile electronic device display are both made of metal, the side tabs provide electrical insulation, which is important for radio frequency and antenna design. For example, when both the frame and the back of the display are made of metal, there is a probability that contact of the two metals grounds the antenna and causes the operation of the device to be unstable. The side tabs maintain a space between the side of the display and the side of the frame to avoid metal to metal contact.

It will be understood that if both the frame and the display do not have abutments, the foam support comprises the base 12 (with no apertures), the side tabs 16 and flanges 20. In this embodiment, the assembly fixture would not include abutments and alignment of the foam support, the assembly fixture and the mobile electronic device frame is facilitated by the positioning pins.

It should also be appreciated that a frame represents one type of device component to which a support and display may be mounted. In one alternative embodiment, a foam support is affixed to a portion of a device housing.

In addition, although references are made above to folding the side tabs to a position perpendicular to the base, the invention is in no way limited thereto. In other embodiments, alternate orientations of the tabs, dependent on the shape of the display and the device frame or housing, are contemplated.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method of assembling a mobile electronic device display and mobile electronic device frame, the frame having side edges substantially perpendicular to a frame base for retaining edges of the display, comprising the steps of:

placing a foam support on a fixture assembly to expose a first surface of the foam support, the foam support, formed of a foam material for separating the display from the device frame and for cushioning movement of the display relative to the device frame, having a substantially planar base, flanged side tabs extending from selected locations on a perimeter of, and in the same plane as, the substantially planar base and slots located between the flanged side tabs and the substantially planar base, and an adhesive layer provided on the first surface of the planar base and the side tabs and the fixture assembly being configured to receive the frame, pressing the frame onto the fixture assembly to form the foam support to the frame, the flanged side tabs being thereby folded against the side edges, such that the adhesive layer on the planar base and flanged side tabs adheres to the frame base and the side edges, respectively;

removing the frame and affixed foam support from the fixture assembly; and placing the display into the frame such that it is retained by the side edges and cushioned by the affixed foam support.

2. The method of claim 1, wherein a surface opposite the first surface is provided with an adhesive to further retain the display within the frame.

* * * * *